United States Patent [19]

Hodges

[11] Patent Number: 4,759,683
[45] Date of Patent: Jul. 26, 1988

[54] AUTOMOTIVE DOLLY

[76] Inventor: Edward A. Hodges, 4425 Creemore Dr., Charlotte, N.C. 28213

[21] Appl. No.: 83,160

[22] Filed: Aug. 10, 1987

Related U.S. Application Data

[63] Continuation-in-part of Ser. No. 413, Jan. 5, 1987.

[51] Int. Cl.⁴ .............................................. B60P 3/06
[52] U.S. Cl. ................................. 414/563; 280/43.19; 280/402
[58] Field of Search ........ 414/563, 484, 485, 474–476; 280/402, 43.19

[56] References Cited

U.S. PATENT DOCUMENTS

| 2,625,279 | 1/1953 | Dalby et al. | 414/563 |
| 2,937,772 | 5/1960 | Sullivan | 414/563 |
| 3,624,786 | 11/1971 | Lundahl | 414/475 |
| 3,720,330 | 3/1973 | Forse et al. | 414/563 |

*Primary Examiner*—Joseph E. Valenza
*Assistant Examiner*—David A. Bucci
*Attorney, Agent, or Firm*—Clifton Ted Hunt

[57] ABSTRACT

An automotive dolly for supporting one end of a vehicle above the ground. The dolly comprises an elongated beam supported on a wheeled axle. The beam has a load end and a free end connected by a chain restrained against vertical movement as by passing under the axle to anchor the free end of the beam as mechanism elevates the load end of the beam and an attached vehicle.

6 Claims, 2 Drawing Sheets

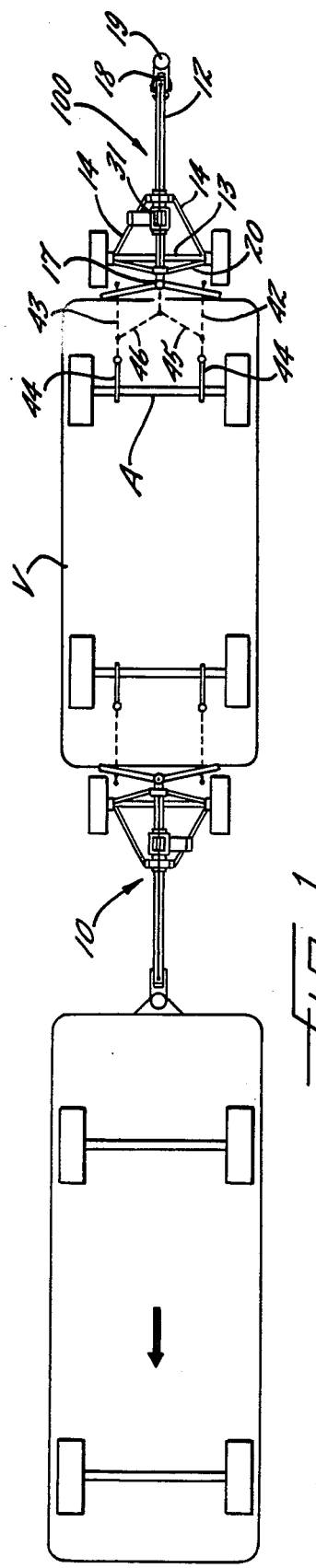
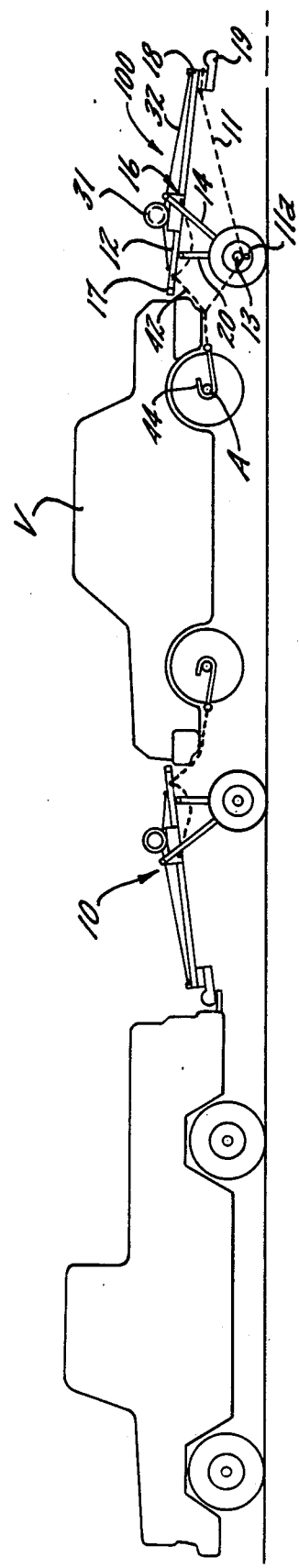
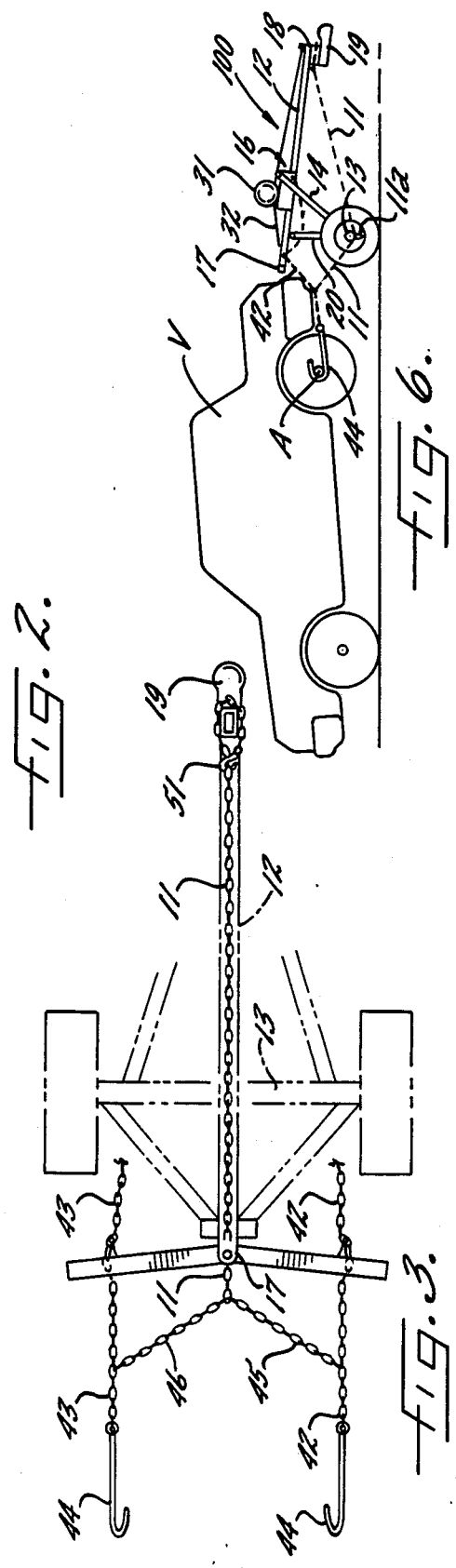

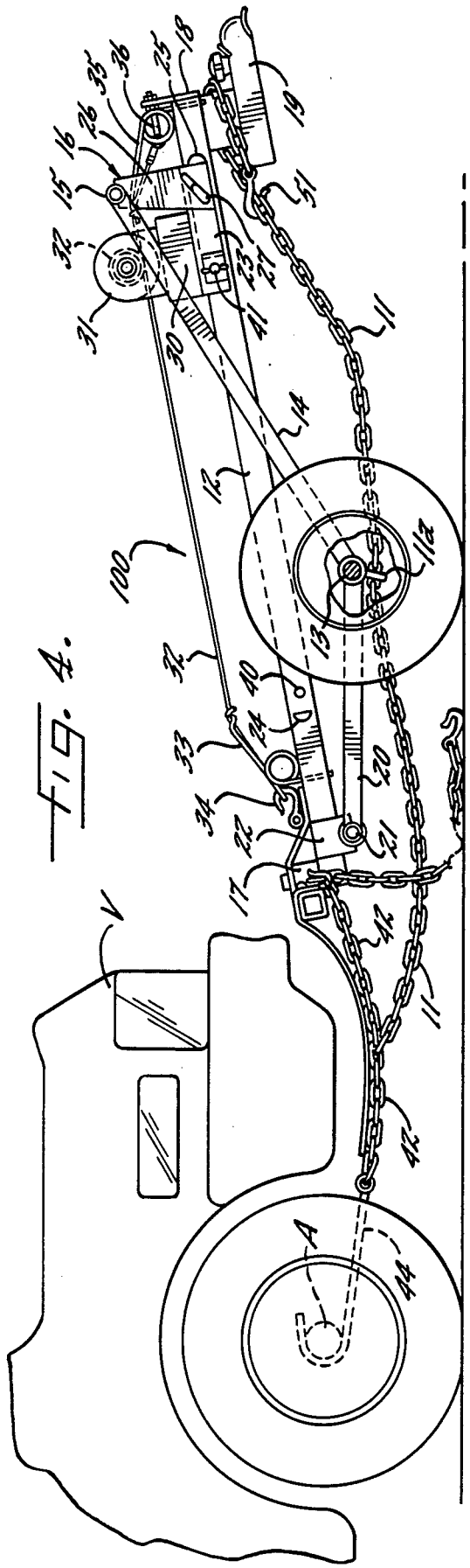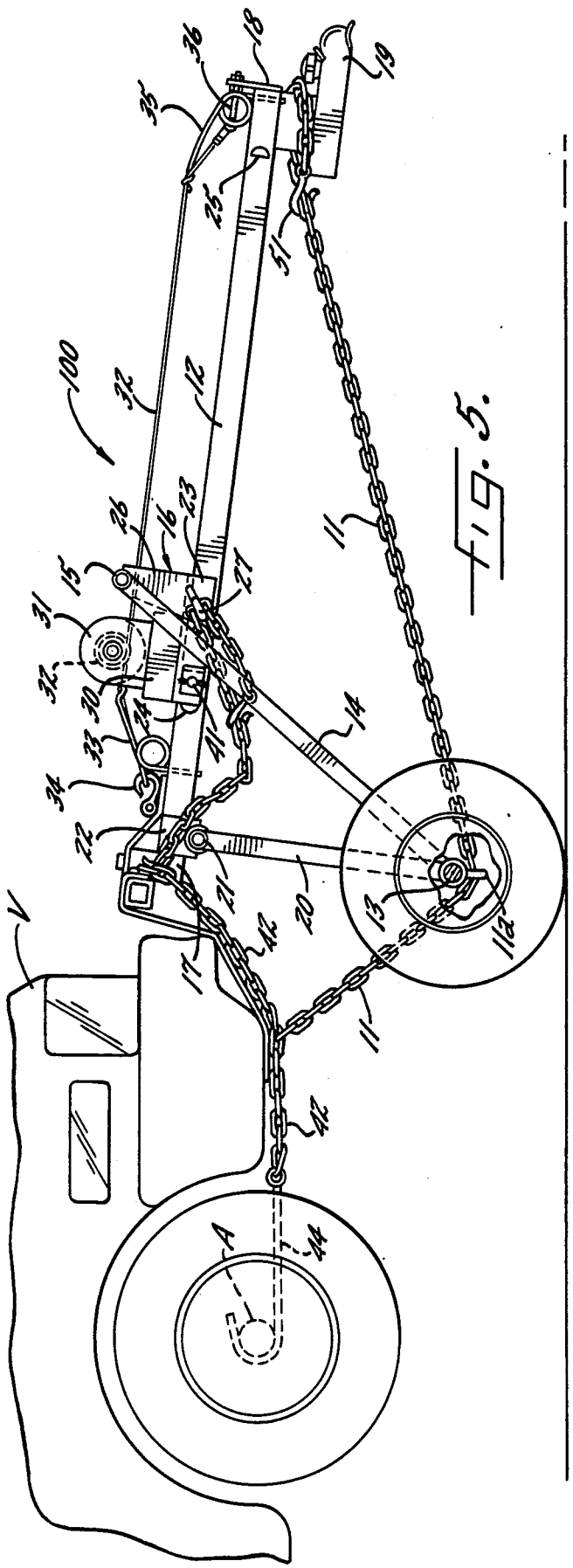

AUTOMOTIVE DOLLY

CROSS-REFERENCE TO RELATED APPLICATIONS

This application is a continuation-in-part of my prior co-pending application Ser. No. 000,413, filed Jan. 5, 1987 for PORTABLE TOWING TRAILER.

FIELD OF THE INVENTION

This invention is an automotive dolly for lifting and supporting above the ground one end of a vehicle, either for towing or for repair.

BACKGROUND OF THE INVENTION

My said pending application Ser. No. 000,413 discloses a portable tow trailer small enough to be carried in the back of a pickup truck and and light enough for one man to unload it and connect it to the truck for towing a disabled vehicle. The tow trailer is capable of lifting and supporting the leading end of a disabled vehicle being towed.

The tow trailer of my said earlier application includes a beam connected by a conventional tow coupling to the back of a draft vehicle, such as a pickup truck. The ususal J-hooks and chains are used to connect the load end of the beam to the leading end of a disabled vehicle to.

The beam is about five feet long and a slidable carriage supports a winch on the beam. A cable is wrapped on the winch and the ends of the cable are fixed to opposite ends of the beam so activation of the winch moves the carriage between the ends of the beam. A wheeled axle is pivotally connected by push arms to the carriage and pivotally connected by support arms to the load end of the beam.

Actuation of the winch moves its supporting carriage, the push arms, and the wheeled axle along the beam and the pivotal support arms elevate the load end of the beam and the attached vehicle for towing.

SUMMARY OF THE INVENTION

The automotive dolly of this invention has the same structure as the portable tow trailer described and claimed in my earlier application. As used herein, the term "dolly" means a stand alone wheeled conveyance that is not directly attached to a draft vehicle and which supports one end of a vehicle above the ground for towing or repair.

The tow trailer of my earlier application can be converted to the automotive dolly of the present application by the addition and use of a draft chain extending from a vehicle attached to the load end of the beam, under the axle beneath the beam, and fixed to the opposite free end of the beam. When the winch is activated to elevate the load end of the beam and the attached vehicle in the manner described in the preceding discussion of the background of the invention, the elevation of the vehicle tensions the draft chain and holds the free end of the beam down but above the ground.

One example of the utility of the automotive dolly is supporting the disabled trailing end of a wrecked vehicle off the ground while the tow trailer of my earlier application, or a wrecker, supports the leading end of the wrecked vehicle off the ground for towing.

The dolly may also be used to lift and support one end of a vehicle being repaired. The dolly can be manipulated to reposition the vehicle within the repair area.

BRIEF DESCRIPTION OF THE DRAWINGS

FIG. 1 is an inverted plan view illustrating the tow trailer of my earlier invention connected between a draft vehicle and the leading end of a disabled vehicle with the automotive dolly of this invention connected to the trailing end of the disabled vehicle;

FIG. 2 is a side elevation of the arrangement shown in FIG. 1 illustrating the tow trailer supporting the leading end of the vehicle off the ground and the automotive dolly of this invention supporting the trailing end of the vehicle off the ground;

FIG. 3 is a schematic inverted plan view of the draft chain, the tow chains and the dolly, which is partially shown in phantom lines;

FIG. 4 is an enlarged side elevation, partially in section and with parts broken away, illustrating the automotive dolly attached to one end of a vehicle and illustrating the slack disposition of the chains before the winch is activated to elevate the vehicle;

FIG. 5 is a view similar to FIG. 4 illustrating the chains and dolly after the winch has been activated to elevate the vehicle; and FIG. 6 is a side elevation similar to FIG. 2 but illustrating use of the automotive dolly without the tow trailer and draft vehicle.

DETAILED DESCRIPTION OF THE INVENTION

Referring more specifically to the drawings, the numeral 10 broadly indicates the portable tow trailer which is the subject of my pending application Ser. No. 000,413, filed Jan. 5, 1987. The automotive dolly of the present invention is broadly indicated by the numeral 100.

The trailer 10 and dolly 100 are alike except that the dolly 100 includes a draft chain 11 and its retainer 11A which are not disclosed or suggested in said application Ser. No. 000,413. Otherwise, the structure of the trailer 10 and dolly 100 are identical.

The trailer 10 is fully described in said earlier application and the description is repeated here with respect to the automotive dolly 100 to the extent deemed necessary for an understanding of the dolly and its operation.

The automotive dolly 100 comprises an elongated tubular beam 12 which is preferably rectangular in cross section and pivotally connected to an axle 13 extending transversely in variably spaced relation beneath the beam. The pivotal connection of the axle 13 and beam 12 includes push arms 14 fixed against movement relative to the axle and pivotally connected as at 15 to a carriage broadly indicated at 16.

The carriage 16 is mounted for reciprocal movement between the load end 17 and the free end 18 of the beam 11. The load end 17 is to be attached to a vehicle and the free end 18 includes a tow coupling 19. The tow coupling 19 is not used with the dolly 100 but is available for connection to a draft vehicle when the dolly is used without the draft chain as a tow trailer.

Support arms 20 are pivotally connected to the axle 13 and extend forwardly therefrom in a substantially horizontal plane when the carriage 16 is in the inactive or retracted position of FIG. 4, near the free end 18 of the dolly. The ends of the support arms 20 remote from the axle 13 are pivotally connected as at 21 to a bracket 22 secured to the beam 12 near its load end 17.

The support arms 20 are moved to the substantially vertical position of FIGS. 2, 5, and 6 and elevate the end 17 of the beam 12 to its extended or towing position when the carriage 16 is moved along the beam 12 from its retracted position (FIG. 4) near the free end 18 to its active position (FIG. 5) near the loan end 17 of the beam.

The carriage 16 comprises a rectangular tubular slide member 23 extending about the beam 12 and movable between a stop 24 near the end 17 of the beam and a stop 25 near the end 18 of the beam. A bracket 26 extends upwardly from the slide member 23 to receive the pivot pin 15 joining the push arms 14 to the carriage 16. A safety hook 27 is welded to the lower side of bracket 26.

A superstructue 30 is fixed to the top of slide member 23 and supports a winch 31 which may be manually or electrically operated. A cable 32 extends about the winch and has one end 33 attached to a hook 34 near the load end 17 of beam 12. The other end 35 of cable 32 is attached to hook 36 at the free end 18 of beam 12. Actuation of the winch 31 in one direction moves the carriage 16 toward the hook 34 at end 17 and actuation of the winch in the opposite direction moves the carriage 16 along the beam 12 toward the hook 36 at the free end 18.

The beam 12 has an opening 40 spaced inwardly or to the right of the stop 24 in FIG. 4. The opening 40 extends through the side wall of the beam 12 and receives a spring-pressed plunger 41 on the slide member 23 of carriage 16 when the carriage is in the extended operative position of FIG. 5. The plunger 41 acts as a lock to prevent accidental movement of the carriage relative to the beam while the vehicle is elevated.

The dolly 100 is connected to the vehicle in the same way as the tow trailer 10 of my previous application by first activating the winch to position the carriage 16 near the free end 18 of beam 12 to lower the load end 17 of the beam 12. The lowered end 17 is connected to a vehicle V by tow chains 42 and 43 connected at corresponding ends to J-hooks 44 fitted about one axle A of the vehicle as shown in FIG. 3.

The foregoing description of the dolly 100 is equally applicable to the tow trailer 10, which is more fully described in said pending patent application Ser. No. 000,413, and a further description of the tow trailer 10 is deemed unnecessary to an understanding of the present invention.

The draft chain 11 includes linkage 45 and 46 diverging from the chain 11 in FIG. 3 to connect with the tow chains 42 and 43 near the J-hooks 44 and beneath the vehicle V. The draft chain 11 extends from its linkage 45 and 46 in the same vertical plane as the beam 12 as best seen in FIG. 3. The chain 11 is restrained against vertical movement above the beam 12 as by passing the chain under the axle 13 to anchor the free end 18 against the action of the winch to elevate the load end of the beam and its attached vehicle. The chain 11 is restrained from lateral movement by the U-shaped retainer 11A extending about the chain beneath the axle and welded to the housing of the axle 13.

FIG. 4 illustrates the relation of the dolly and draft chain just after the load end 17 of the dolly has been attached to the vehicle V and the carriage 16 is still at its inactive position near the free end 18 of the beam 12. The draft chain is slack with its end remote from the linkage 45,46 attached to the end 18 of the dolly in any convenient manner, as by wrapping the chain about the tow coupling 19 and fastening the chain 11 on itself with a hook 51.

FIG. 5 shows the carriage 16 of the dolly 100 moved to its active position near the end 17 of the beam, causing elevation of the support arms 20, the load end 17 of the beam 12, and the end of the vehicle V attached thereto. The chain 11 holds the free end 18 of the dolly above the ground.

The free end 18 provides anchorage or support, through the chain 11, for the winch 31 to work against in elevating the load end 17 and the vehicle when the winch is operated to raise the support arms 20 to the position of FIG. 5. Without the draft chain, operation of the winch would elevate the free end 18 and leave the vehicle on the ground.

The utility of my tow trailer is thus enhanced by the addition of a draft chain and its retainer, enabling the trailer to function as an automotive dolly when desired.

Although specific terms have been used in describing the invention, they have been used in a generic and descriptive sense only and not for purposes of limitation.

I claim:

1. In an apparatus for supporting one end of a vehicle above the ground, said apparatus having a load end and a free end supported on a wheeled axle, means for attaching the load end of the apparatus to one end of a vehicle and means for elevating the load end of the apparatus and the one end of the vehicle, the combination of a draft chain connected to said free end and connected to said means attaching the load end of the apparatus to one end of the vehicle and means preventing vertical movement of the draft chain above its said connections during elevation of the vehicle.

2. An automotive dolly for supporting one end of a vehicle above the ground, said dolly comprising an elongated beam, a wheeled axle beneath the beam, means connecting the beam to the axle to raise one end of the beam, means attaching one end of a vehicle to said one end of the beam, a chain connected at one of its ends to the said attachment between the vehicle and the beam and the other end of said chain being connected to the other end of the beam, and means restraining the chain from vertical movement above the beam when the one end of the beam is raised.

3. An automotive dolly according to claim 2 wherein said means connecting the beam to the axle to raise one end of the beam includes a carriage slidable along the beam and means for moving the carriage between the ends of the beam.

4. An automotive dolly according to claim 2 wherein said means restraining the chain from vertical movement is the axle.

5. An automotive dolly according to claim 4 which includes means for limiting lateral movement of the chain.

6. An automotive dolly according to claim 5 wherein said means for limiting lateral movement of the chain comprises a retainer welded to the axle and extending about the chain.

* * * * *